United States Patent
Samler

(10) Patent No.: US 6,884,958 B2
(45) Date of Patent: Apr. 26, 2005

(54) WELDING TORCH HAVING INTEGRAL COLLET AND COLLET BODY AND METHOD OF OPERATING SAME

(75) Inventor: Gary R. Samler, Holmes Beach, FL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/244,218

(22) Filed: Sep. 16, 2002

(65) Prior Publication Data
US 2004/0050822 A1 Mar. 18, 2004

(51) Int. Cl.⁷ .............................................. B23K 9/24
(52) U.S. Cl. ...................................................... 219/75
(58) Field of Search ......................... 219/75, 74, 76.11

(56) References Cited

U.S. PATENT DOCUMENTS

| | | | | |
|---|---|---|---|---|
| 2,468,807 A | * | 5/1949 | Herbst | 219/75 |
| 2,468,808 A | * | 5/1949 | Drake | 219/75 |
| 2,880,302 A | | 3/1959 | Cresswell | 219/74 |
| 3,116,406 A | * | 12/1963 | Barnes | 219/75 |
| 3,250,889 A | * | 5/1966 | Himmelman | 219/75 |
| 3,548,143 A | * | 12/1970 | Reeh | 219/75 |
| 3,557,337 A | * | 1/1971 | Sipos et al. | 219/75 |
| 3,794,806 A | * | 2/1974 | Klasson | 219/121.45 |
| 4,142,086 A | * | 2/1979 | Rotilio | 219/75 |
| 4,250,373 A | * | 2/1981 | Tanida | 219/121.36 |
| 4,275,284 A | * | 6/1981 | Conley | 219/74 |
| 4,300,034 A | * | 11/1981 | Schneider et al. | 219/75 |
| 4,354,088 A | * | 10/1982 | Rehrig | 219/75 |
| 4,508,951 A | * | 4/1985 | Rehrig, Jr. | 219/74 |
| 4,517,437 A | * | 5/1985 | Yerushalmy et al. | 219/121.5 |
| 4,543,461 A | * | 9/1985 | Hill | 219/75 |
| 4,788,401 A | * | 11/1988 | Kleppen | 219/75 |
| 4,918,280 A | * | 4/1990 | Jankus | 219/75 |
| 5,556,550 A | | 9/1996 | Fyffe | 219/75 |
| 5,714,729 A | * | 2/1998 | Yamada et al. | 219/75 |

FOREIGN PATENT DOCUMENTS

| | | | |
|---|---|---|---|
| DE | 19642774 A1 | 4/1997 | ............ B23K/9/28 |
| EP | 1291112 A | 3/2003 | |
| GB | 777374 | 6/1957 | |
| GB | 1 458 116 | 12/1976 | |

* cited by examiner

Primary Examiner—Kiley S. Stoner
Assistant Examiner—Kevin McHenry
(74) Attorney, Agent, or Firm—Fletcher Yoder

(57) ABSTRACT

A welding torch member for securing an electrode to a welding torch is provided. The welding torch member may comprise first and second portions. Each of the first and second portions may have a hole therethrough to enable an electrode to extend through the first and second portions. The first portion may be adapted to secure the welding torch member to a welding torch body. The first and second portions may have a hole therethrough to enable the electrode to extend through the welding torch member. The second portion may be adapted so that it may be compressed onto the electrode to secure the electrode to the welding torch. A second welding torch member may be urged against the first welding torch member to compress the second portion onto the electrode. The first and second welding torch members may be secured to a welding torch. A power source may be used to provide power to the electrode through the welding torch member.

35 Claims, 3 Drawing Sheets

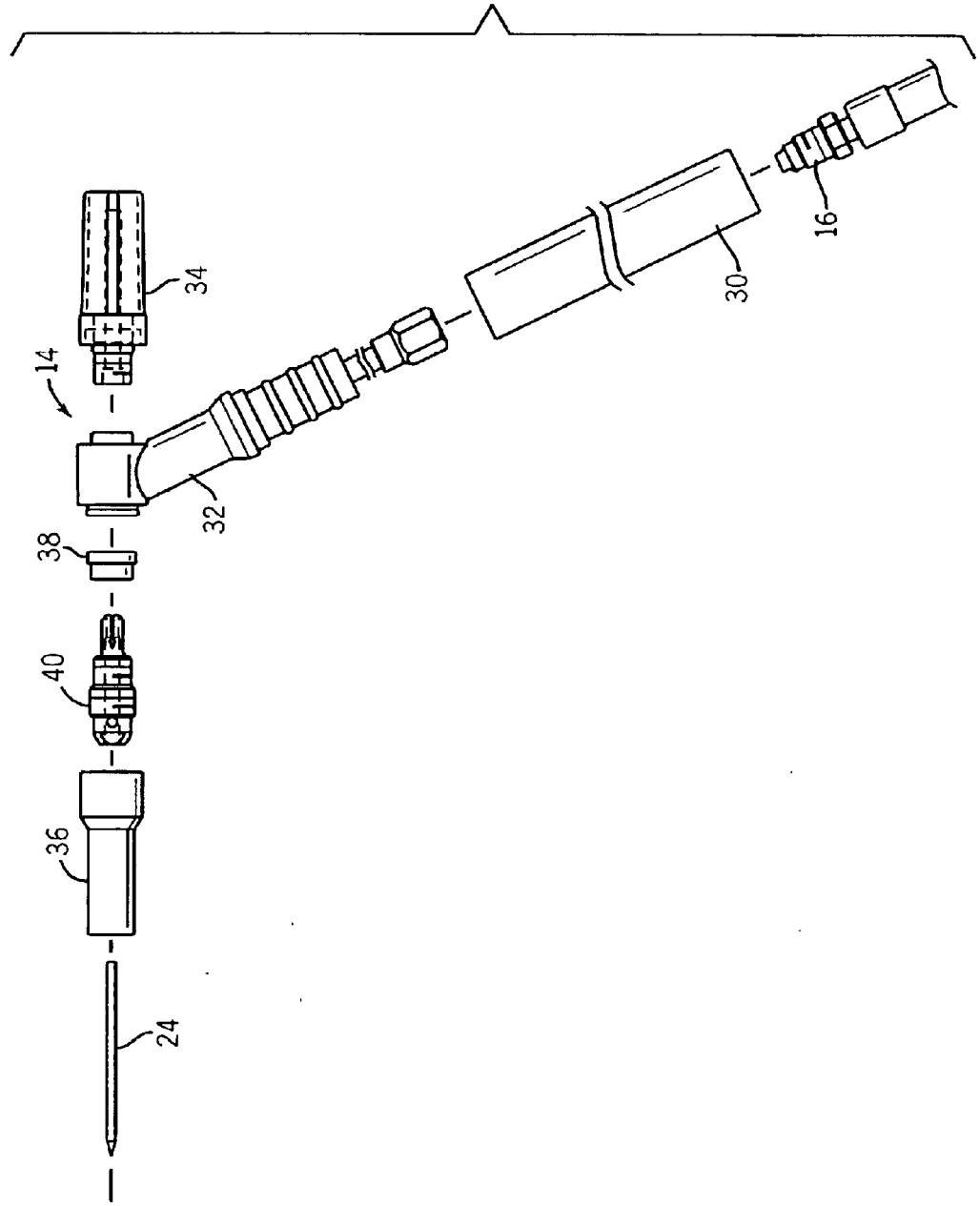

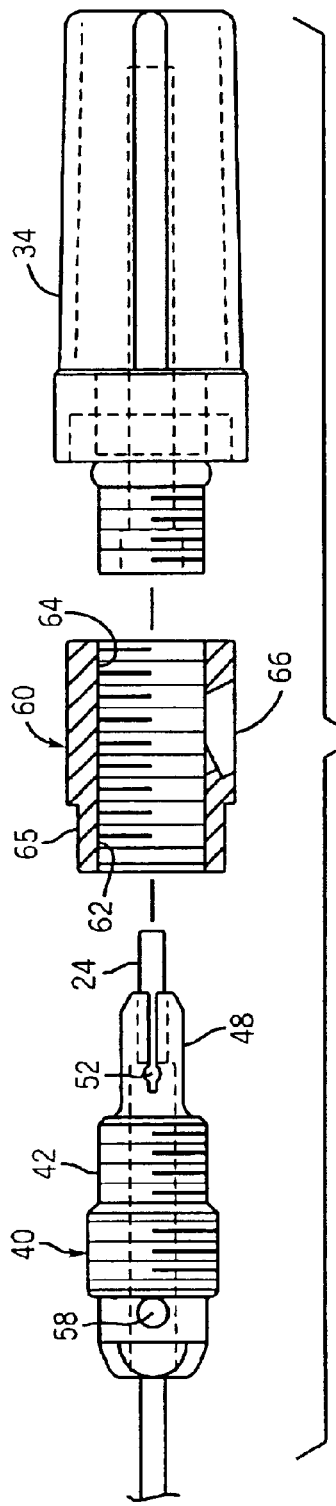
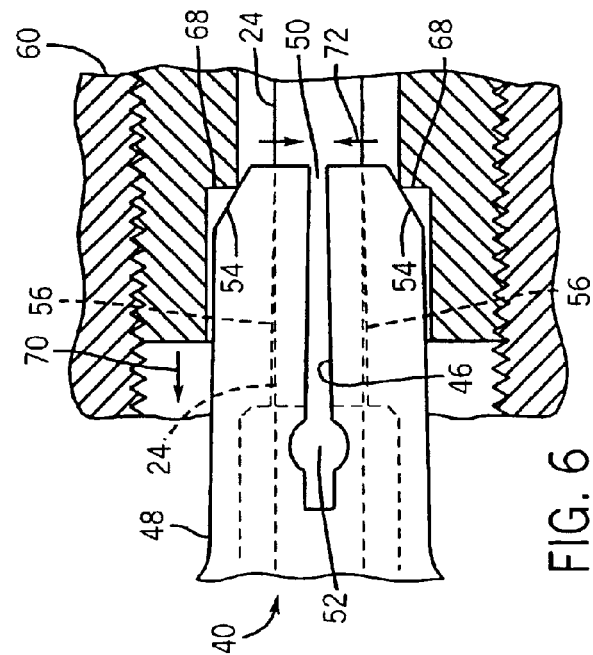
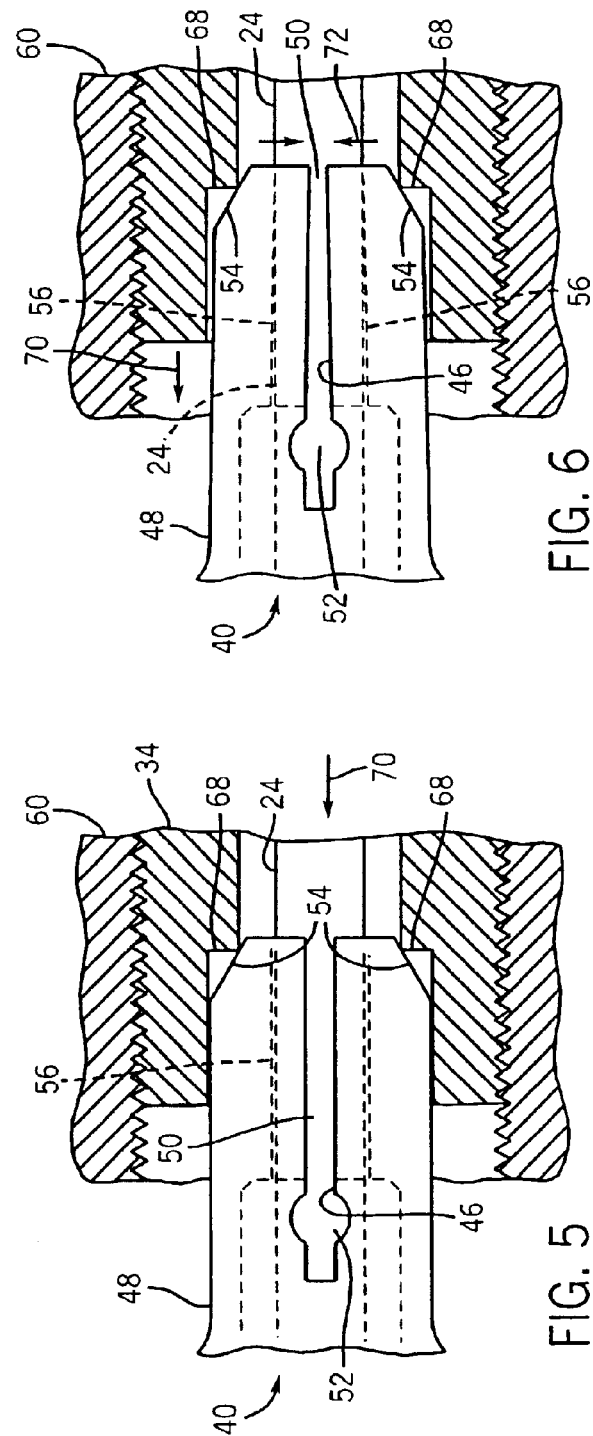

WELDING TORCH HAVING INTEGRAL COLLET AND COLLET BODY AND METHOD OF OPERATING SAME

BACKGROUND OF THE INVENTION

The present invention relates generally to the field of arc welding systems, and more particularly to an arc welding torch adapted to receive a cylindrical metal electrode.

TIG (Tungsten Inert Gas) welding (also known as gas tungsten arc welding, GTAW, or HELIARC) is a type of arc welding process in which an electric arc is maintained between a cylindrical metal electrode and a metal object. The heat generated by the arc produces localized melting of the metal object. The electrode, typically tungsten, is secured to a torch to enable a user to direct the electrode and establish the point of contact between the electrode and the object. TIG welding may be performed with or without the addition of a filler metal. Typically, the weld puddle and the area surrounding the weld puddle are protected from the atmosphere by an inert gas. The inert gas prevents rapid oxidation of the weld and the surrounding metal.

A ground cable is used to connect the metal object to the power supply. When the electrode is placed in close proximity to or against the metal object, the electrode in the welding handle completes an electrical circuit between the power supply and the metal object, allowing electrical current to flow through the electrode and metal object. The electrical current produces an arc between the electrode and the metal object. The heat of the electric arc melts the metal object in the region surrounding the electric arc. A filler material may be placed against the molten portion of the object, melting the filler material and allowing the molten filler material to merge with the molten object. Once the electrode is drawn away from the metal object, the circuit is broken and the molten mass begins to cool and solidify, forming a weld.

The electricity for the welding process is provided by a power source through a welding cable coupled to the torch. Typically, the power source is a constant voltage AC, DC, or a combination AC/DC source. In addition, a TIG welding cable typically is adapted to transport the inert gas to the torch. Furthermore, the TIG welding process typically generates a substantial amount of heat in the electrode. Consequently, cooling fluid may be used to cool the torch. Thus, a welding cable for a TIG welding system may transport electricity, gas, and cooling fluid.

A tungsten electrode typically is secured to a TIG welding torch by a collet, a collet body, and a backcap. To secure the electrode to a welding torch, the electrode is inserted through the collet and collet body. Typically, the collet body is threaded into a front portion of the torch head and the backcap is threaded into the rear portion of the torch head, with the collet located between the collet body and backcap. As the backcap is threaded into the torch head, the backcap urges the collet against the interior of the collet body. The collet body is adapted to compress the collet against the electrode as the collet is driven against the collet body, thereby securing the electrode to the torch. In addition, the collet body is adapted to enable gas to flow into the rear end of the collet body around the electrode and out through holes in the side of the collet body.

There are a number of problems associated with the use of a collet and collet body to secure an electrode to a welding torch. One problem is that the collet may become misaligned during assembly, resulting in the electrode becoming misaligned. A misalignment of the electrode or collet may produce non-uniform gas flow through the welding torch. In addition, a collet typically is a relatively small object that may be easily dropped during assembly or replacement of an electrode. Furthermore, for each diameter of electrode there is an appropriately sized collet and collet body. Therefore, the correct collet and collet body must both be determined and selected by a user for each installation of an electrode, thereby increasing the difficulty and time required to install an electrode in a welding torch, especially when changing from an electrode of one diameter to an electrode of another diameter.

A need exists for a technique to enable an electrode to be secured to a welding torch using fewer parts. In addition, a need exists for a technique to enable a user to install an electrode in a welding torch more easily than existing techniques that utilize a separate collet and a collet body. Furthermore, a need exists for a technique to enable a user to replace electrodes of different diameters more easily than existing techniques that utilize a collet and a collet body. There also exists a need for a device that enables an electrode to be secured to a welding torch consistently in a concentric orientation to provide proper shielding gas flow through the welding torch.

SUMMARY OF THE INVENTION

The present technique may solve one or more of the needs outlined above. According to one aspect of the present technique, a welding torch member for securing an electrode to a welding torch is provided. The welding torch member may comprise first and second portions. Each of the first and second portions may have a hole therethrough to enable an electrode to extend through the first and second portions. The first portion may be adapted to secure the welding torch member to a welding torch body. The first and second portions may have a hole therethrough to enable the electrode to extend through the welding torch member. The second portion may be adapted so that it may be compressed onto the electrode to secure the electrode to the welding torch. A second welding torch member may be urged against the first welding torch member to compress the second portion onto the electrode. The first and second welding torch members may be secured to a welding torch. A power source may be used to provide power to the electrode through the welding torch member.

According to another aspect of the present technique, a method of securing a welding electrode to a welding torch is provided. The method may comprise securing a first torch member to a welding torch. The method also may comprise disposing an electrode through the first torch member. In addition, the method may comprise securing a second torch member to the welding torch and urging first and second torch members into abutment to compress the first torch member against the welding electrode.

BRIEF DESCRIPTION OF THE DRAWINGS

The foregoing and other advantages and features of the invention will become apparent upon reading the following detailed description and upon reference to the drawings in which:

FIG. 2 is an exploded view of a welding torch, according to an exemplary embodiment of the present technique;

FIG. 4 is an exploded view illustrating the orientation of the integral collet/collet body and backcap to a threaded portion of the welding torch; and FIGS. 5 and 6 are detailed views illustrating the capture of an electrode by the cooperation of the integral collet/collet body and backcap, according to an exemplary embodiment of the present technique.

DETAILED DESCRIPTION OF SPECIFIC EMBODIMENTS

Figure 1:
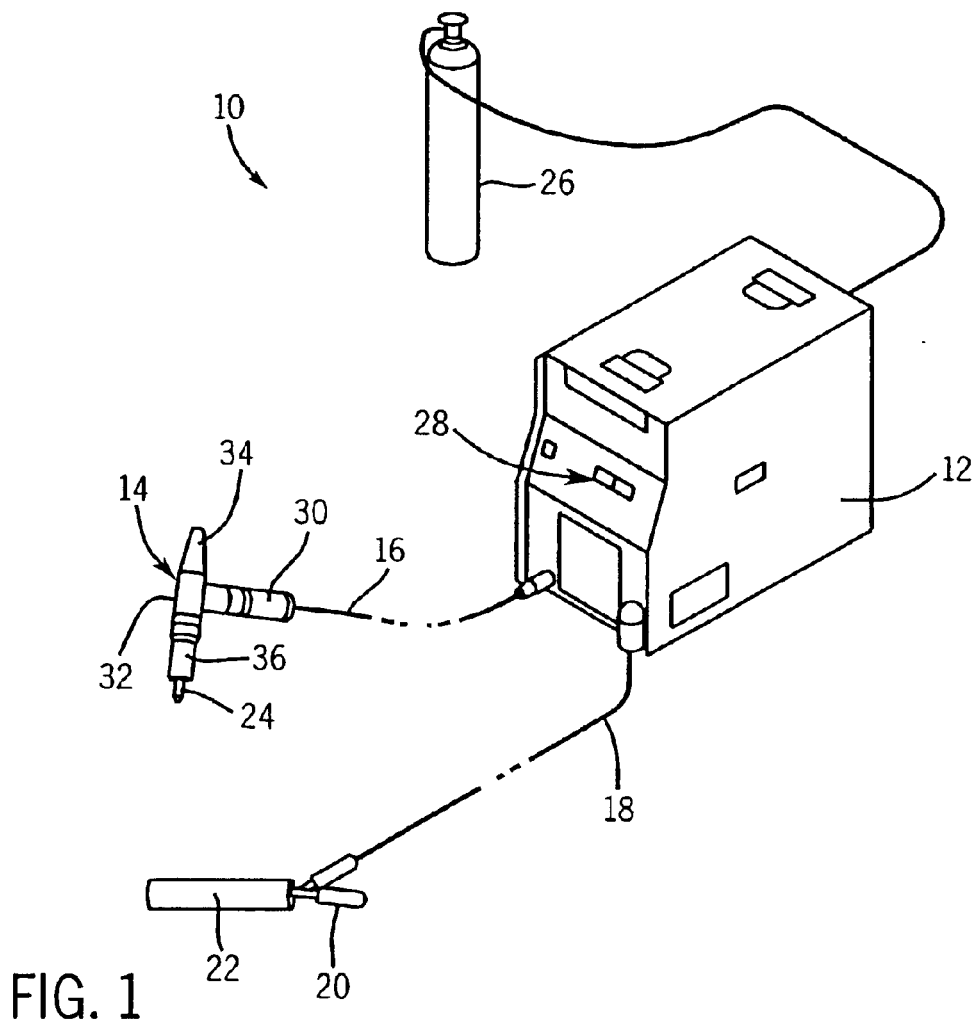
FIG. 1 is a welding system, according to an exemplary embodiment of the present technique.

Referring generally to FIG. 1, a TIG welding system is illustrated, as represented generally by reference numeral 10. However, the present techniques also are applicable to other welding systems. The TIG welding system 10 comprises a power supply 12, a TIG welding torch 14, a welding cable 16, and a return cable 18. The power supply 12 may be a constant voltage AC, DC, a combination AC/DC source, or some other type of power supply. The welding cable 16 electrically couples the welding torch 14 to one terminal of the power supply 12. The return cable 18 is coupled to a second terminal of the power supply 12. In the illustrated embodiment, the return cable 18 has a clamp 20 that is adapted to secure and electrically couple the return cable 18 to a workpiece 22 to be welded. In the illustrated embodiment, the welding torch 14 is adapted to receive a cylindrical tungsten electrode 24. When the electrode 24 comes in close proximity to or touches the material 22 to be welded, an electric circuit is completed from one terminal of the power supply 12, through the welding cable 16, the electrode 24, the workpiece 22, the work clamp 20, and the return cable 18 to a second terminal of the power supply 12.

In the illustrated embodiment, gas from a gas cylinder 26 is coupled to the torch 14 via the power supply 12 and the welding cable 16. In this embodiment, the power supply 12 has numerous controls 28 to enable a user to control various operating parameters of the power supply 12, such as the output amperage.

In the illustrated embodiment, the welding torch 14 has a handle 30 that is adapted to receive the welding cable 16. The handle 30 may be held by a user to direct the electrode 24 towards a desired location. The welding torch 14 also has a torch body 32 that is adapted to receive the electrode 24 and direct the inert gas towards the workpiece 22. The electrode 24 may extend through the torch body 32. In this embodiment, the torch 14 has a backcap 34 that is adapted to receive a portion of the electrode 24 extending through one end of the torch body 32. The backcap is adapted to seal the end of the torch body 32 so that gas does not leak out of the torch body 32. Various lengths of backcaps may be used to enable the torch body to receive electrodes of different lengths. In this embodiment, a nozzle 36 is located at the front end of the torch body 32, opposite the backcap 34. The nozzle 36 is adapted to direct gas towards the workpiece 22.

Referring generally to FIG. 2, an exploded view of welding torch 14 is illustrated. In the illustrated embodiment, an insulator 38 is provided for electrical isolation. In addition, an integral collet/collet body 40 is provided to secure the electrode 24 to the torch body 32. The integral collet/collet body 40 is secured to the end of the torch body 32 opposite the backcap 34. In this embodiment, the torch body 32 enables relative movement between the integral collet/collet body 40 and the backcap 34. The integral collet/collet body 40 cooperates with the torch body 32 and backcap 34 to apply a gripping force to the electrode 24.

Figure 3:
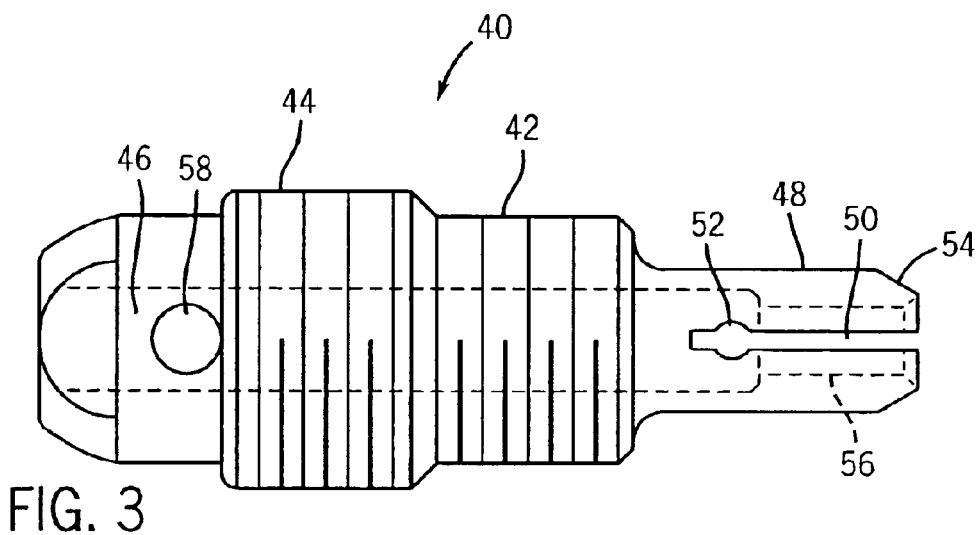
FIG. 3 is an elevational view of an integral collet/collet body, according to an exemplary embodiment of the present technique.

Referring generally to FIG. 3, the integral collet/collet body 40 has a first threaded portion 42 and a second threaded portion 44. The first threaded portion 42 is adapted to secure the integral collet/collet body 40 to the torch body 32. The second threaded portion 44 is adapted to secure the nozzle 36, or some other member, to the integral collet/collet body 40. The integral collet/collet body 40 has a chamber 46 extending therethrough to enable the electrode 24 to extend through the integral collet/collet body 40. The integral collet/collet body 40 also has a tubular portion 48, similar to a collet, that extends into the torch body 32 when the integral collet/collet body 40 is secured to the torch body 32.

In the illustrated embodiment, the tubular portion 48 of the integral collet/collet body 40 has four slits 50 located at 90° intervals around the diameter of the tubular portion 48. The slits 50 enable the tubular portion 48 to be compressed. In this embodiment, each slit 50 has an entrance hole 52 for gas. The tubular portion 48 also has a tapered end surface 54. The tampered end surface 54 is adapted to cooperate with the backcap 34 to compress the tubular portion 48. The tubular portion 48 is adapted with a gripping surface 56 on the inside diameter of the tubular portion 48. The gripping surface 56 is a constriction in the chamber 46 that enables the tubular portion 48 to capture the electrode 24 when the tubular portion 48 is compressed. The entrance holes 52 enable gas to enter the chamber 46 of the integral collet/collet body 40 after the gripping surface 56 is squeezed against the electrode 24. In the illustrated embodiment, the integral collet/collet body 40 also has four exit holes 58 disposed at 90° intervals around the integral collet/collet body 40. Gas flows out of chamber 46 to the nozzle 36 through exit holes 58.

Referring generally to FIG. 4, the torch body 32 has an internally threaded torch head 60. The torch head 60 has a first threaded portion 62 at one end for threading the integral collet/collet body 40 to the torch head 60 and a second threaded portion 64 for threading the backcap 34 to the torch head 60. The torch body 32 also has an insulating layer 65 disposed over the torch head 60 to electrically insulate the torch body 32. In addition, the torch head 60 has a hole 66 to enable gas to flow through the torch body 32. The electrode 24 may be disposed through the integral collet/collet body 40 either before or after the integral collet/collet body 40 is secured to the torch head 60. In addition, an electrode 24 and an integral collet/collet body 40 may be provided together in a kit form with the electrode 24 predisposed through the integral collet/collet body 40. The integral collet/collet body 40 may be adapted to use friction between the electrode 24 and integral collet/collet body 40 to maintain the electrode disposed through the integral collet/collet body 40.

As best illustrated in FIGS. 5 and 6, the backcap 34 and integral collet/collet body 40 cooperate to secure the electrode 24 to the torch head 60. In the illustrated embodiment, the integral collet/collet body 40 and electrode 24 are fixed and the backcap 34 is moved toward the integral collet/collet body 40 to secure the electrode 24. However, the backcap 34 may be fixed and the integral collet/collet body 40 moved toward the backcap 34 to secure the electrode 24. In the illustrated embodiment, the backcap 34 has a lip 68 that extends around the inner circumference of the backcap 34. As the backcap 34 is rotated clockwise, the backcap 34 is driven towards the integral collet/collet body 40, as represented by arrow 70. Eventually, the lip 68 contacts the tapered end surface 54 of the integral collet/collet body 40. As the backcap 34 is driven further towards the integral collet/collet body 40, the lip 68 of the backcap urges the tapered end surface 54 inward, causing the tubular portion 48 to compress, as represented by the arrows 72. As the tubular portion 48 is compressed, the gripping surface 56 of the integral collet/collet body 40 is driven against the electrode 24. The friction produced between the gripping surface 56 and the electrode 24 secures the electrode 24 to the integral collet/collet body 40 and, thus, the torch head 60.

The techniques described above enable an electrode to be installed in a welding torch in a simpler manner and with fewer parts than existing techniques because a separate collet and collet body are not used. In addition, the techniques provided above enable an electrode to be secured to a welding torch in a more consistent concentric orientation because the portion holding the electrode during assembly, i.e., the integral collet/collet body, is secured directly to the torch head. The more consistent concentric orientation of the electrode produces a more consistent shielding gas flow through the welding torch. In addition, an electrode and integral collet/collet body may be pre-packaged to enable a user to quickly replace an electrode and integral collet/collet body.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding torch member for securing an electrode to a welding torch head, comprising:
    a first threaded portion adapted to secure the welding torch member to a threaded portion of the welding torch head; and
    a compressible portion adapted to extend through the welding torch head to enable the compressible portion to be compressed onto the electrode by a backcap secured to a rear portion of the welding torch head.

2. The welding torch member as recited in claim 1, wherein the compressible portion is compressed onto the electrode by threading the backcap onto the rear portion of the welding torch head.

3. The welding torch member as recited in claim 2, wherein the compressible portion comprises a tapered exterior surface adapted to abut an interior surface of the backcap.

4. The welding torch member as recited in claim 3, wherein the backcap is adapted to seal an end portion of the welding torch head opposite the welding torch member.

5. The welding torch member as recited in claim 1, wherein the compressible portion comprises at least one first hole therethrough to enable gas to enter an interior portion of the welding torch member.

6. The welding torch member as recited in claim 5, wherein the compressible portion comprises at least one slit extending along the compressible portion to enable the compressible portion to be compressed against the electrode by the backcap.

7. The welding torch member as recited in claim 5, wherein the first threaded portion comprises at least one second hole therethrough to enable gas to exit the interior of the welding torch member.

8. The welding torch member as recited in claim 1, wherein the welding torch member comprises a second threaded portion adapted for threading a nozzle member to the welding torch member.

9. The welding torch member as recited in claim 8, wherein the second threaded portion has a larger diameter than the first threaded portion.

10. A kit for a welding torch, comprising:
    a welding electrode; and
    a first torch member adapted to secure the welding electrode to a welding torch head, the first torch member comprising:
        a first threaded portion securable to a first end of the welding torch head;
        a compressible portion adapted to extend through the welding torch head to enable a backcap threaded to a second end of the welding torch head to compress the compressible portion of the first torch member onto the welding electrode
        a second threaded portion adapted for threaded engagement with a corresponding threaded portion of a nozzle.

11. A kit for a welding torch, comprising:
    a welding electrode; and
    a first torch member adapted to secure the welding electrode to a welding torch head, the first torch member comprising:
        a first threaded portion securable to a first end of the welding torch head; and
        a compressible portion adapted to extend through the welding torch head to enable a backcap threaded to a second end of the welding torch head to compress the compressible portion of the first torch member onto the welding electrode,
        wherein the first torch member is adapted to enable gas to flow through the first torch member.

12. The kit as recited in claim 11, wherein the compressible portion of the first torch member comprises a plurality of slots to enable the compressible portion to be compressed against the welding electrode.

13. The kit as recited in claim 12, wherein the compressible portion comprises a tapered end adapted to be compressed against the welding electrode by abutment with a corresponding tapered portion of the backcap.

14. The kit as recited in claim 11, wherein the welding electrode is disposed through the first torch member, relative movement of the first torch member and welding electrode being opposed by friction between the first torch member and the welding electrode.

15. The kit as recited in claim 11, wherein the welding electrode is a tungsten electrode.

16. A welding torch, comprising:
    a backcap securable to a welding torch head and movable relative thereto; and
    a second torch member having an opening therethrough to enable a welding electrode to extend through the second torch member, the second torch member comprising:
        a first portion adapted to secure the second torch member to a welding torch head; and
        a second portion adapted to be compressed by the backcap to secure the welding electrode to the welding torch,
        wherein the torch member has a first hole therethrough to enable gas to enter an interior portion of the torch member and a second hole to enable gas to exit the interior portion of the torch member.

17. The welding torch as recited in claim 16, wherein the welding electrode is secured to the welding torch by urging the backcap against the second portion of the torch member.

18. The welding torch as recited in claim 17, wherein the second portion of the torch member is wedged between the backcap and the welding electrode by urging the backcap into abutment with the torch member.

19. The welding torch as recited in claim 16, wherein the second portion is adapted to be compressed against the welding electrode.

20. The welding torch as recited in claim 19, wherein the second portion comprises a plurality of slits extending along a length of the first portion.

21. The welding torch as recited in claim 19, wherein the second portion comprises a constriction in an interior portion of the torch member.

22. The welding torch as recited in claim 16, wherein the electrode is a cylindrical metal electrode.

23. The welding torch as recited in claim 22, wherein the welding torch is a TIG welding torch.

24. A method of securing a welding electrode to a welding torch, comprising:
   threading a first torch member to a first threaded portion of the welding torch;
   disposing a cylindrical metal electrode through the first torch member; and
   urging a backcap into abutment with the first torch member to compress the first torch member against the welding electrode.

25. The method as recited in claim 24, wherein urging the backcap comprises threading the backcap into a second threaded portion of the welding torch.

26. The method as recited in claim 25, wherein urging the backcap comprises forming a seal between the backcap and the welding torch.

27. A securing member for securing an electrode to a welding torch, comprising:
   a collet body portion adapted to secure the securing member to a welding torch head, wherein the collet body portion comprises a first threaded portion to enable the collet body portion to be threaded to the welding torch head; and
   a collet portion integral with the collet body portion, wherein the collet portion is adapted to abut a inner surface of a backcap to capture the electrode.

28. The securing member as recited in claim 27, wherein the collet portion comprises at least one slit extending longitudinally along the collet portion.

29. A securing member for securing an electrode to a welding torch, comprising:
   a collet body portion adapted to secure the securing member to a welding torch head;
   a collet portion integral with the collet body portion, wherein the collet portion is adapted to abut a inner surface of a backcap to capture the electrode; and
   a chamber therethrough to enable gas to flow through the securing member.

30. The securing member as recited in claim 29, wherein the collet body portion of the securing member is adapted for threaded engagement with a threaded portion of a nozzle.

31. A welding system, comprising:
   a welding torch, comprising:
   a welding torch head;
   a first torch member adapted to receive an electrode therethrough, the first torch member being securable to a first end of the welding torch head; and
   a backcap securable to a second end of the welding torch head,
   wherein the first torch member is adapted to extend through the welding torch head to abut the backcap to urge the first torch member into engagement with the electrode, and
   wherein the first torch member is adapted with a threaded portion for threaded engagement with a corresponding threaded portion of the welding torch head.

32. The welding system as recited in claim 31, wherein the backcap is axially displaceable relative to the welding torch head to urge the backcap into abutment with the first torch member.

33. The welding system as recited in claim 31, wherein the first torch member is adapted to be compressed against the electrode as the first torch member and the backcap are urged into engagement.

34. The welding system as recited in claim 31, comprising a source of electric current, wherein the welding torch is adapted to couple electric current from the source of electric current to the electrode via the first torch member.

35. The welding system as recited in claim 31, wherein the welding system is a TIG welding system.

* * * * *